United States Patent
Takeuchi

(10) Patent No.: US 6,569,803 B2
(45) Date of Patent: May 27, 2003

(54) CATALYST FOR PURIFYING EXHAUST GAS

(75) Inventor: Masahiko Takeuchi, Aichi-ken (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 136 days.

(21) Appl. No.: 09/759,144

(22) Filed: Jan. 16, 2001

(65) Prior Publication Data

US 2001/0016554 A1 Aug. 23, 2001

(30) Foreign Application Priority Data

Jan. 19, 2000 (JP) .......................... 2000-014116
Dec. 7, 2000 (JP) .......................... 2000-372909

(51) Int. Cl.[7] .................... B01J 23/58; B01J 23/00; B01J 23/40; B01J 23/42; B01J 23/56
(52) U.S. Cl. .................... 502/328; 502/325; 502/326; 502/327; 502/330; 502/332; 502/333; 502/334; 502/339; 502/439; 502/525
(58) Field of Search ................ 502/325, 326, 502/327, 328, 330, 332, 333, 334, 335, 336, 337, 338, 339, 439, 525, 302, 303, 304

(56) References Cited

U.S. PATENT DOCUMENTS

| 3,884,837 A | | 5/1975 | Remeika et al. | |
|---|---|---|---|---|
| 3,897,367 A | * | 7/1975 | Lauder | 252/462 |
| 4,049,583 A | * | 9/1977 | Lauder | 252/466 PT |
| 4,110,254 A | * | 8/1978 | Lauder | 252/462 |
| 4,134,852 A | * | 1/1979 | Volin | 252/472 |
| 4,162,235 A | * | 7/1979 | Acres et al. | 252/462 |
| 4,485,191 A | * | 11/1984 | Sekido et al. | 502/303 |
| 4,748,143 A | * | 5/1988 | Tabata et al. | 502/304 |
| 4,812,300 A | * | 3/1989 | Quinlan et al. | 423/404 |
| 4,921,829 A | * | 5/1990 | Ozawa et al. | 502/302 |
| 5,057,482 A | * | 10/1991 | Fukuda et al. | 502/303 |
| 5,182,249 A | * | 1/1993 | Wang et al. | 502/303 |
| 5,242,881 A | * | 9/1993 | Tang et al. | 502/244 |
| 5,559,073 A | * | 9/1996 | Hu et al. | 502/302 |
| 5,972,828 A | * | 10/1999 | Doi et al. | 502/302 |
| 6,060,420 A | * | 5/2000 | Munakata et al. | 502/302 |
| 6,146,549 A | * | 11/2000 | Mackay et al. | 252/373 |
| 6,248,688 B1 | * | 6/2001 | Wu et al. | 502/302 |
| 6,248,689 B1 | * | 6/2001 | Manson | 502/340 |
| 6,287,432 B1 | * | 9/2001 | Mazanec et al. | 204/265 |
| 6,352,955 B1 | * | 3/2002 | Golden | 502/302 |
| 6,355,093 B1 | * | 3/2002 | Schwartz et al. | 95/56 |
| 6,372,686 B1 | * | 4/2002 | Golden | 502/302 |
| 6,395,675 B1 | * | 5/2002 | Suga et al. | 502/326 |

FOREIGN PATENT DOCUMENTS

| EP | 0 455 491 A2 | 11/1991 |
|---|---|---|
| EP | A2 0 941 757 | 9/1999 |
| GB | A 2 322 309 | 8/1998 |
| JP | 5-245372 | 9/1993 |
| JP | 5-261289 | 10/1993 |
| JP | 6-315634 | 11/1994 |
| JP | 9-248458 | 9/1997 |
| JP | 10-33984 | 2/1998 |
| JP | 10-128114 | 5/1998 |
| JP | A 59-162948 | 9/1998 |

* cited by examiner

*Primary Examiner*—Stanley Silverman
*Assistant Examiner*—Cam N. Nguyen
(74) *Attorney, Agent, or Firm*—Oliff & Berridge, PLC

(57) ABSTRACT

A catalyst, for purifying an exhaust gas, contains at least one catalyst component from among Pt, Pd, Rh, Au, Ag and Ir, and a complex oxide of the perovskite type comprising at least two different metal elements. In the catalyst, the catalyst component is carried on the complex oxide.

23 Claims, 4 Drawing Sheets

(a)

(b)

(a)

(b)

CATALYST FOR PURIFYING EXHAUST GAS

BACKGROUND OF THE INVENTION

1. Field of the Invention

The present invention relates to a catalyst, for purifying an exhaust gas, used for the purification of the exhaust gas emitted from internal combustion engines of automobiles and the like and, more specifically, it relates to a catalyst for purifying an exhaust gas with a notably improved $NO_x$ purifying performance at high temperature.

2. Description of the Related Art

Reduction of total carbon dioxide ($CO_2$) emissions and nitrous oxide ($NO_x$) production from internal combustion engines of automobiles and the like have become worldwide issues from the standpoint of protecting the earth's environment. Some measures being taken include the development of "lean burn" engines for improved mileage and the development of $NO_x$ purifying catalysts of an absorption-reduction type that provide conventional three-way catalysts with the additional function of absorbing $NO_x$ in a lean atmosphere for purification of the exhaust gas, and a certain degree of success has thereby been achieved against the aforementioned problems.

Lean burn engines ordinarily burn fuel under conditions with a "lean" air/fuel (A/F) ratio (air excess), and for limited periods burn fuel under stoichiometric (theoretical air/fuel ratio) to rich (fuel excess) conditions.

The hydrocarbons (HC) and carbon monoxide (CO) in an exhaust gas are efficiently removed by combustion due to the effect of the oxidizing atmosphere and catalyst at the lean end, while $NO_x$ is occuluded in the absorbent at the lean end and temporarily released under stoichiometric to rich conditions, and is purified by reduction due to the effect of the temporary reducing atmosphere and the catalyst.

Alkali metals or alkaline earth metals have conventionally been used as the $NO_x$ absorbents of $NO_x$ purifying catalysts of an absorption-reduction type, and the catalysts for purifying an exhaust gas are constructed by loading a catalyst component such as platinum and a carbonic acid salt or acetic acid salt of an alkali metal or alkaline earth metal on a carrier such as γ-alumina. Such catalysts for purifying an exhaust gas are described, for example, in Japanese Unexamined Patent Publications No. 9-248458, No. 10-33984 and No. 10-128114.

On the other hand, specific complex oxides of the perovskite type are known to have the effect of decomposing $NO_x$ into $N_2$ and $O_2$, and $NO_x$ catalytic reduction type catalysts comprising specific complex oxides of the perovskite type carried on carriers are described, for example, in Japanese Unexamined Patent Publications No. 5-261289, No. 5-245372 and No. 6-315634.

Nevertheless, $NO_x$ purifying catalysts of the absorption-reduction type carrying alkali metal salts or alkaline earth metal salts using carbonic acid salts or acetic acid salts still have room for an improved $NO_x$ purifying performance at catalytic temperatures that are above approximately 500° C.

Also, catalysts comprising conventional complex oxides of perovskite type are used for purification of exhaust gas emitted from internal combustion engines of automobile engines and the like, and are thus still need a higher $NO_x$ purifying efficiency.

It is therefore an object of the present invention to provide an improved catalyst for purifying an exhaust gas that can exhibit excellent $NO_x$ purifying performance even at catalytic temperatures exceeding approximately 500° C.

SUMMARY OF THE INVENTION

The aforementioned object is achieved by a catalyst for purifying an exhaust gas characterized in that at least one catalyst component from among platinum (Pt), palladium (Pd), rhodium (Rh), gold (Au), silver (Ag) and iridium (Ir) is carried on a complex oxide of the perovskite type comprising at least two different metal elements.

That is, this invention is a catalyst comprising a catalyst component such as platinum directly carried on a specific complex oxide of the perovskite type. While the reason for the high $NO_x$ purifying performance of such a catalyst is not fully understood, it is theorized to be as follows.

Complex oxides of the perovskite type comprising at least two different metal elements generally produce distortion in crystals due to the difference in atomic radii of the metal elements contained therein, and it is believed that the structural oxygen defects of this crystal distortion have an activating effect on $NO_x$, and that the activating effect works synergistically with the effect of the catalyst component such as platinum. This synergistic effect is believed to become significant when a catalyst component such as platinum is directly carried on the complex oxide of perovskite type.

DETAILED DESCRIPTION OF THE PREFERRED EMBODIMENTS

Figure 1:
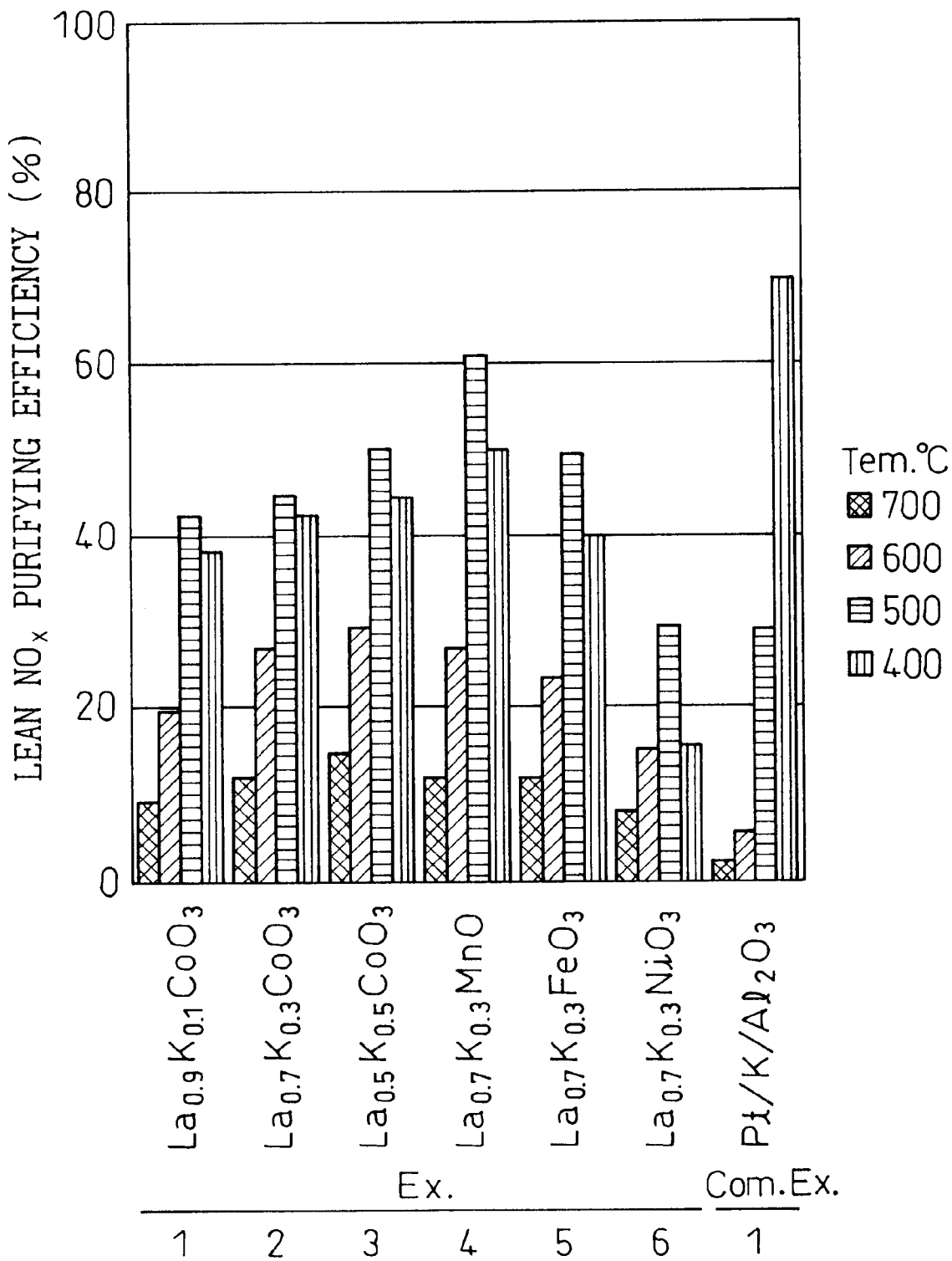
FIG. 1 is a graph showing a comparison of different catalysts in terms of the relationship between exhaust gas temperature and $NO_x$ purifying efficiency.

The complex oxide of the perovskite type in the catalyst of this invention comprises at least two different metal elements. Here, the metal elements may be any selected from among s-block metal elements, d-block metal elements, p-block metal elements and f-block metal elements, which are specifically, sodium (Na), potassium (K), calcium (Ca), barium (Ba), strontium (Sr), lanthanum (La), yttrium (Y), cerium (Ce), praseodymium (Pr), neodymium (Nd), samarium (Sm), europium (Eu), gadolinium (Gd), titanium (Ti), tin (Sn), zirconium (Zr), manganese (Mn), iron (Fe), cobalt (Co), nickel (Ni), chromium (Cr), niobium (Nb), copper (Cu), vanadium (V), molybdenum (Mo), tungsten (W), zinc (Zn), tantalum (Ta), etc.

According to a preferred embodiment, the complex oxide of perovskite type in the catalyst of this invention is a specific complex oxide of the perovskite type comprising K and having the structural formula $La_{1-x}K_xBO_3$ (wherein B is at least one from among Mn, Co, Fe and Ni), wherein $0 \leq x < 1$, preferably $0.05 < x < 1$, more preferably $0.1 < x < 0.5$, even more preferably $0.1 < x < 0.4$, and most preferably $0.2 < x < 0.4$.

According to another preferred embodiment, the complex oxide of the perovskite type in the catalyst of this invention is a specific complex oxide of the perovskite type comprising K and having the structural formula $A_{1-x}K_xB_{1-y}Ti_yO_3$ (wherein A is at least one from among La, Ce, Pr, Nd, Sm, Eu, Gd and Y, and B is at least one from among Mn, Co, Fe and Ni), wherein preferably A is La, $0 \leq x<1$, preferably $0.05<x<1$, more preferably $0.1<x<0.5$, even more preferably $0.1<x<0.4$ and most preferably $0.2<x<0.4$, and $0 \leq y<1$, preferably $0.05<y<1$, more preferably $0.1<y<0.5$, even more preferably $0.1<y<0.4$ and most preferably $0.2<y<0.4$.

It was found that such specific complex oxides of the perovskite type can provide higher $NO_x$ purifying performance at high temperature. The reason for this is not completely understood but is thought to be as follows.

Complex oxides of the perovskite type having the structural formulas given above have a portion of their crystal lattice substituted with specific elements and, therefore, in addition to the aforementioned crystal distortions due to differences in atomic radii, the crystal structure is also more unstable. It is believed that the structural metal atoms undergo valency changes with changes in the temperature or atmosphere, and can therefore absorb or release oxygen, producing a synergistic effect with the effect of the platinum, etc.

It is also attributed to the fact that elements at the B site of complex oxides of perovskite type having the aforementioned structure exhibit an oxidation-reduction effect, and that this oxidation-reduction effect becomes particularly notable especially when a portion of the B site atoms are replaced with titanium.

Another possible reason that may be set forth is the following.

In conventional $NO_x$ purifying catalysts of absorption-reduction type carrying carbonic acid salts or acetic acid salts of alkali metals or alkaline earth metals, the alkali metals or alkaline earth metals may be converted to nitric acid salts under lean conditions or to carbonic acid salts under rich conditions. These salts undergo decomposition at temperatures over about 500° C., and it is believed that this accounts for the lower high-temperature $NO_x$ absorption performance of alkali metals or alkaline earth metals carried in the form of such carbonic acid salts or acetic acid salts.

In contrast, while the aforementioned complex oxides of the perovskite type, according to this invention, which contain potassium are stable even at high temperatures, at least some of the potassium can be released in positive ion form from the complex oxides of perovskite type at high temperatures, and it is thought that the remaining negative ions act as base sites for $NO_x$ and that the negatively ionized $NO_x$ molecules become trapped by the positive potassium ions.

Thus, it is believed that the oxygen absorbing-releasing effect of these specific complex oxides of perovskite type can act synergistically with the catalytic effect of the catalyst components such as platinum, while also functioning as $NO_x$ absorbents at high temperature, thereby providing high $NO_x$ purifying performance at high temperatures.

Such complex oxides of the perovskite type can be prepared, for example, by first mixing a prescribed proportion of a powder of the nitric acid salts, acetic acid salts, chlorides, etc. of the elements to be included, or mixing as an aqueous solution and drying, and then heating in air at 400–1000° C.

The catalyst of this invention has at least one catalyst component from among Pt, Pd, Rh, Au, Ag and Ir carried on the above-mentioned complex oxide of the perovskite type. The loading may be accomplished by precipitation, adsorption, ion-exchange, reducing precipitation, evaporation to dryness, etc., selected from among methods that allow metal particles to be carried on a carrier.

The catalyst component is preferably carried in an amount of 0.1–10 g, and preferably 0.3–4 g, with respect to 100 g of the complex oxide of the perovskite type by mass.

The catalyst component is preferably carried after adjusting the complex oxide of the perovskite type to a particle size of 0.05–20 μm by pulverization or the like. This results in more uniform dispersion of the catalyst component on the complex oxide of the perovskite type.

According to a preferred embodiment, an alkali metal or alkaline earth metal is further carried onto the complex oxide of the perovskite type on which the catalyst component has been carried. As alkali metals there may be mentioned lithium (Li), sodium (Na), potassium (K), rubidium (Rb), etc., and as alkaline earth metals there may be mentioned magnesium (Mg), calcium (Ca), strontium (Sr), barium (Ba), etc.

These alkali metals and alkaline earth metals can exhibit satisfactory $NO_x$ absorbing performance in catalytic temperature regions of up to approximately 500° C., and their use in combination with complex oxides of the perovskite type can therefore further widen the temperature region for $NO_x$ purification.

These alkali metals and alkaline earth metals may be carried by a precipitation method using the carbonic acid salts or acetic acid salts of the metals.

The loading amount for these alkali metals and alkaline earth metals is preferably 0.01–2 moles, and more preferably 0.05–0.5 mole, as the number of moles of the alkali metal or alkaline earth metal based on 100 g of the complex oxide of the perovskite type by mass.

According to a preferred embodiment, at least one inorganic oxide selected from among alumina, titania, zirconia and silica is mixed with the complex oxide of the perovskite type on which the catalytic component has been carried. This increases the total amount of catalyst, and raises the catalytic efficiency for exhaust gas.

The mixing may be accomplished, for example, by mechanical mixing of the inorganic oxide such as alumina with the complex oxide of perovskite type on which the catalyst component has been carried, or by mixing them together in slurry form. The amount of the inorganic oxide is preferably 10–250 g, and more preferably 50–200 g, with respect to 100 g of the complex oxide of perovskite type by mass.

The loading of the alkali metal or alkaline earth metal may also be accomplished after mixing the inorganic oxide such as alumina with the complex oxide of the perovskite type on which the catalyst component has been carried.

For use of the catalyst for purifying an exhaust gas of this invention as a common honeycomb-type catalyst, the catalyst of this invention may be carried on a honeycomb substrate by wash coating or the like, according to a common method.

Figure 4:
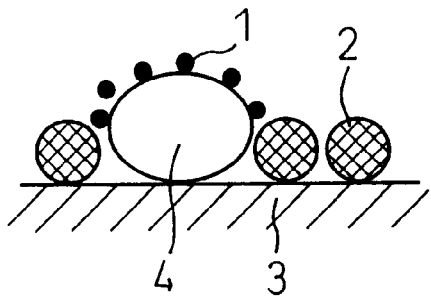
FIG. 4 is a schematic view showing configurations of the catalyst of prior art.
Figure 4:
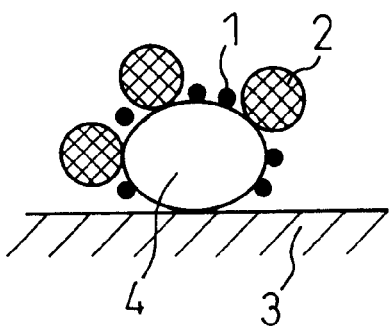
Figure 5:
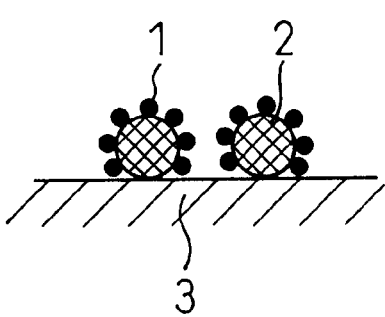
FIG. 5 is a schematic view showing configurations of the catalyst according to this invention.
Figure 5:
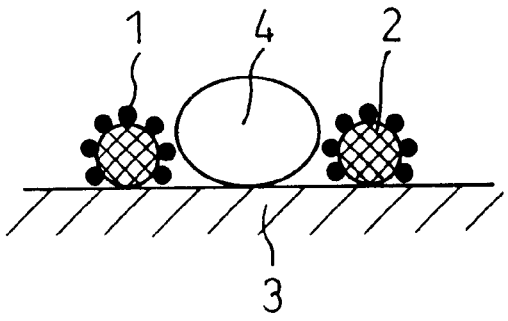

The configurations of the catalyst of the prior art and those according to this invention are schematically compared in FIG. 4 and FIG. 5 respectively. In this invention, the catalyst component (1) is directly carried on the complex oxide (2) of perovskite type, and the complex oxide (2) may be supported on a substrate (3). In the prior art, the catalyst component (1) is carried on a carrier (4) such as alumina, and the complex oxide (2) of perovskite type is carried on or mixed with the carrier (4).

EXAMPLES

Example 1

After dissolving and stirring 38.97 g of $La(NO_3)_3 \cdot 6H_2O$, 1.01 g of $KNO_3$ and 29.1 g of $Co(NO_3)_2 \cdot 6H_2O$ in 300 cc of ion-exchange water, the water was evaporated off and the mixture was dried at 120° C. for 2 hours, calcined at 480° C. for one hour and then fired at 850° C. for 10 hours to obtain a powder of the complex oxide of the perovskite type $La_{0.9}K_{0.1}CoO_3$.

A 50 g portion of the obtained complex oxide powder was dispersed and stirred in 300 cc of ion-exchange water and, after adding an aqueous nitric acid solution of dinitrodiammineplatinum to 2 g in terms of Pt, the water was evaporated off and the mixture was dried at 120° C. for 2 hours, after which it was fired at 500° C. for one hour to obtain the catalyst of this invention.

Example 2

A catalyst of this invention was obtained by the same method as Example 1, except that 30.31 g of $La(NO_3)_3 \cdot 6H_2O$, 3.03 g of $KNO_3$ and 29.1 g of $Co(NO_3)_2 \cdot 6H_2O$ were used. The complex oxide of the perovskite type in the catalyst had the structure $La_{0.7}K_{0.3}CoO_3$.

Example 3

A catalyst of this invention was obtained by the same method as Example 1, except that 21.65 g of $La(NO_3)_3 \cdot 6H_2O$, 5.05 g of $KNO_3$ and 29.1 g of $Co(NO_3)_2 \cdot 6H_2O$ were used. The complex oxide of the perovskite type in the catalyst had the structure $La_{0.5}K_{0.5}CoO_3$.

Example 4

A catalyst of this invention was obtained by the same method as Example 1, except that 30.31 g of $La(NO_3)_3 \cdot 6H_2O$, 3.03 g of $KNO_3$ and 28.7 g of $Mn(NO_3)_2 \cdot 6H_2O$ were used. The complex oxide of the perovskite type in the catalyst had the structure $La_{0.7}K_{0.3}MnO_3$.

Example 5

A catalyst of this invention was obtained by the same method as Example 1, except that 30.31 g of $La(NO_3)_3 \cdot 6H_2O$, 3.03 g of $KNO_3$ and 40.4 g of $Fe(NO_3)_3 \cdot 9H_2O$ were used. The complex oxide of the perovskite type in the catalyst had the structure $La_{0.7}K_{0.3}FeO_3$.

Example 6

A catalyst of this invention was obtained by the same method as Example 1, except that 30.31 g of $La(NO_3)_3 \cdot 6H_2O$, 3.03 g of $KNO_3$ and 29.1 g of $Ni(No_3)_2 \cdot 6H_2O$ were used. The complex oxide of the perovskite type in the catalyst had the structure $La_{0.7}K_{0.3}NiO_3$.

Example 7

After dissolving and stirring 76.0 g of $La(NO_3)_3 \cdot 6H_2O$, 7.6 g of $KNO_3$, 64.8 g of $Mn(NO_3)_2 \cdot 6H_2O$ and titania sol containing 2 g of solid portion in 500 cc of ion-exchange water, the water was evaporated off and the mixture was dried at 120° C. for 2 hours, calcined at 480° C. for one hour and then fired at 850° C. for 10 hours to obtain a powder of the complex oxide of the perovskite type $La_{0.7}K_{0.3}Mn_{0.9}Ti_{0.1}O_3$.

A 50 g portion of the obtained complex oxide powder was dispersed and stirred in 300 cc of ion-exchange water, and after adding an aqueous nitric acid solution of dinitrodiammineplatinum to 2 g in terms of Pt, the water was evaporated off and the mixture was dried at 120° C. for 2 hours, after which it was fired at 500° C. for one hour to obtain the catalyst of this invention.

Example 8

A catalyst of this invention was obtained by the same method as Example 7, except that 76.0 g of $La(NO_3)_3 \cdot 6H_2O$, 7.6 g of $KNO_3$, 50.4 g of $Mn(NO_3)_2 \cdot 6H_2O$ and titania sol containing 6 g of solid portion were used. The complex oxide of the perovskite type in the catalyst had the structure $La_{0.7}K_{0.3}Mn_{0.7}Ti_{0.3}O_3$.

Example 9

A catalyst of this invention was obtained by the same method as Example 7, except that 76.0 g of $La(NO_3)_3 \cdot 6H_2O$, 7.6 g of $KNO_3$, 36.0 g of $Mn(NO_3)_2 \cdot 6H_2O$ and titania sol containing 10 g of solid portion were used. The complex oxide of the perovskite type in the catalyst had the structure $La_{0.7}K_{0.3}Mn_{0.5}Ti_{0.5}O_3$.

Example 10

A catalyst of this invention was obtained by the same method as Example 7, except that 100.0 g of $Sm(NO_3)_3 \cdot 6H_2O$, 2.5 g of $KNO_3$, 50.4 g of $Mn(NO_3)_2 \cdot 6H_2O$ and titania sol containing 6 g of solid portion were used. The complex oxide of the perovskite type in the catalyst had the structure $Sm_{0.9}K_{0.1}Mn_{0.7}Ti_{0.3}O_3$.

Example 11

A catalyst of this invention was obtained by the same method as Example 7, except that 78.0 g of $Sm(NO_3)_3 \cdot 6H_2O$, 7.6 g of $KNO_3$, 50.4 g of $Mn(NO_3)_2 \cdot 6H_2O$ and titania sol containing 6 g of solid portion were used. The complex oxide of the perovskite type in the catalyst had the structure $Sm_{0.7}K_{0.3}Mn_{0.7}Ti_{0.3}O_3$.

Example 12

A catalyst of this invention was obtained by the same method as Example 7, except that 55.6 g of $Sm(NO_3)_3 \cdot 6H_2O$, 12.6 g of $KNO_3$, 50.4 g of $Mn(NO_3)_2$ $6H_2O$ and titania sol containing 6 g of solid portion were used. The complex oxide of the perovskite type in the catalyst had the structure $Sm_{0.5}K_{0.5}Mn_{0.7}Ti_{0.3}O_3$.

Example 13

A catalyst of this invention was obtained by the same method as Example 7, except that 98.6 g of $Nd(NO_3)_3 \cdot 6H_2O$, 2.5 g of $KNO_3$, 50.4 g of $Mn(NO_3)_2 \cdot 6H_2O$ and titania sol containing 6 g of solid portion were used. The complex oxide of the perovskite type in the catalyst had the structure $Nd_{0.9}K_{0.1}Mn_{0.7}Ti_{0.3}O_3$.

Example 14

A catalyst of this invention was obtained by the same method as Example 7, except that 76.7 g of $Nd(NO_3)_3 \cdot 6H_2O$, 7.6 g of $KNO_3$, 50.4 g of $Mn(NO_3)_2 \cdot 6H_2O$ and titania sol containing 6 g of solid portion were used. The complex oxide of the perovskite type in the catalyst had the structure $Nd_{0.7}K_{0.3}Mn_{0.7}Ti_{0.3}O_3$.

Example 15

A catalyst of this invention was obtained by the same method as Example 7, except that 54.8 g of $Nd(NO_3)_3 \cdot$ 6H$_2$O, 12.6 g of KNO$_3$, 50.4 g of Mn(NO$_3$)$_2$·6H$_2$O and titania sol containing 6 g of solid portion were used. The complex oxide of the perovskite type in the catalyst had the structure Nd$_{0.5}$K$_{0.5}$Mn$_{0.7}$Ti$_{0.3}$O$_3$.

Example 16

A 50 g portion of the complex oxide of the perovskite type having the structure Nd$_{0.7}$K$_{0.3}$Mn$_{0.7}$Ti$_{0.3}$O$_3$ produced in Example 14 was dispersed and stirred in 300 cc of ion-exchange water, and after adding an aqueous nitric acid solution of dinitrodiammineplatinum to 2.67 g in terms of Pt, the water was evaporated off and the mixture was dried at 120° C. for 2 hours, after which it was fired at 500° C. for one hour. Next, 16.7 g of γ-alumina was mixed with the Pt-carried complex oxide of the perovskite type, and after redispersion and stirring in 300 cc of ion-exchange water, the mixture was filtered and dried to obtain a catalyst of this invention.

Comparative Example 1

After dispersing and stirring 50 g of γ-alumina powder in 300 cc of ion-exchange water, an aqueous nitric acid solution of dinitrodiammineplatinum was added to 2 g in terms of Pt, and after stirring for one hour the mixture was filtered and dried and then fired at 300° C. for one hour to obtain Pt-carried γ-alumina powder.

Next, 7.4 g of potassium acetate was dissolved in 500 cc of ion-exchange water, and the aforementioned Pt-carried oxide was dispersed in the solution and stirred while heating, the mixture was evaporated to dryness, and then after further drying at 120° C. for 2 hours, it was fired at 500° C. for 2 hours to obtain a catalyst for comparison.

Comparative Example 2

After dispersing and stirring 50 g of γ-alumina powder in 300 cc of ion-exchange water, an aqueous nitric acid solution of dinitrodiammineplatinum was added to 4 g in terms of Pt, and after stirring for one hour the mixture was filtered and dried and then fired at 300° C. for one hour to obtain Pt-carried γ-alumina powder.

Next, 20 g each of this γ-alumina powder and the complex oxide of perovskite type Nd$_{0.7}$K$_{0.3}$Mn$_{0.7}$Ti$_{0.3}$O$_3$ prior to Pt loading used in Example 14 was dispersed and stirred in 500 cc of ion-exchange water to make a uniform slurry which was then filtered and dried to obtain a catalyst for comparison.

Evaluation of NO$_x$ purifying performance

Each of the obtained catalysts was compression molded and pulverized to make pellets with a diameter of 0.5–1.7 mm.

Each pellet catalyst was exposed to an atmosphere which switched between the lean and rich model gas atmospheres described below every 2 minutes while measuring the NO$_x$ purifying performance in the lean atmosphere and determining the NO$_x$ purifying efficiency according to the formula given below.

The amount of catalyst used for the evaluation test was 2 g in all cases, and platinum was contained in each catalyst at 0.385 wt %.

Rich gas composition:
500 ppm NO+2000 ppm HC+0.6% CO+10% CO$_2$+0.3% O$_2$+5% H$_2$O (remainder: N$_2$)
Lean gas composition:
500 ppm NO+2000 ppm HC+0.1% CO+10% CO$_2$+6.5% O$_2$+5% H$_2$O (remainder: N$_2$)

Figure 2:
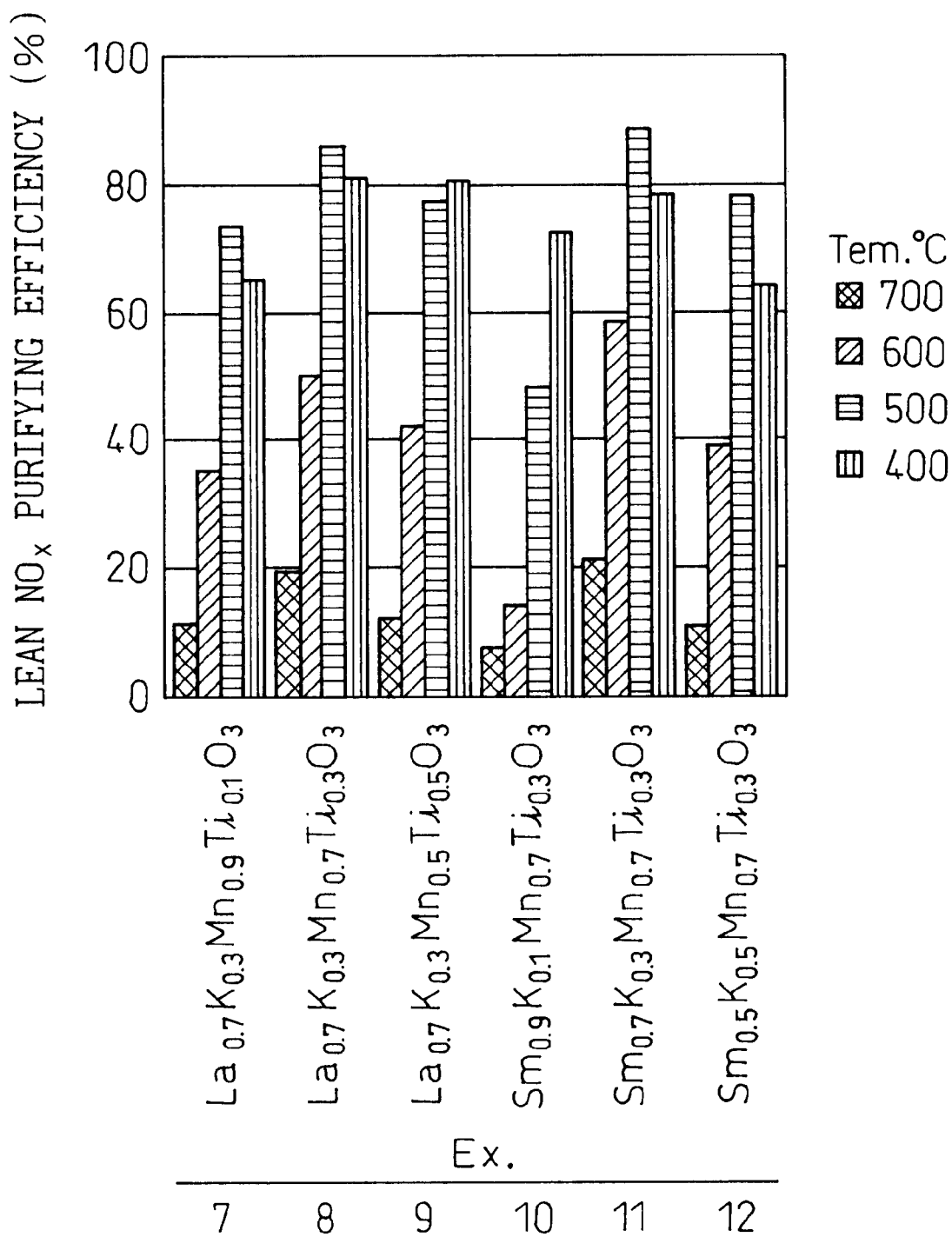
FIG. 2 is a graph showing a comparison of different catalysts in terms of the relationship between exhaust gas temperature and $NO_x$ purifying efficiency.
Figure 3:
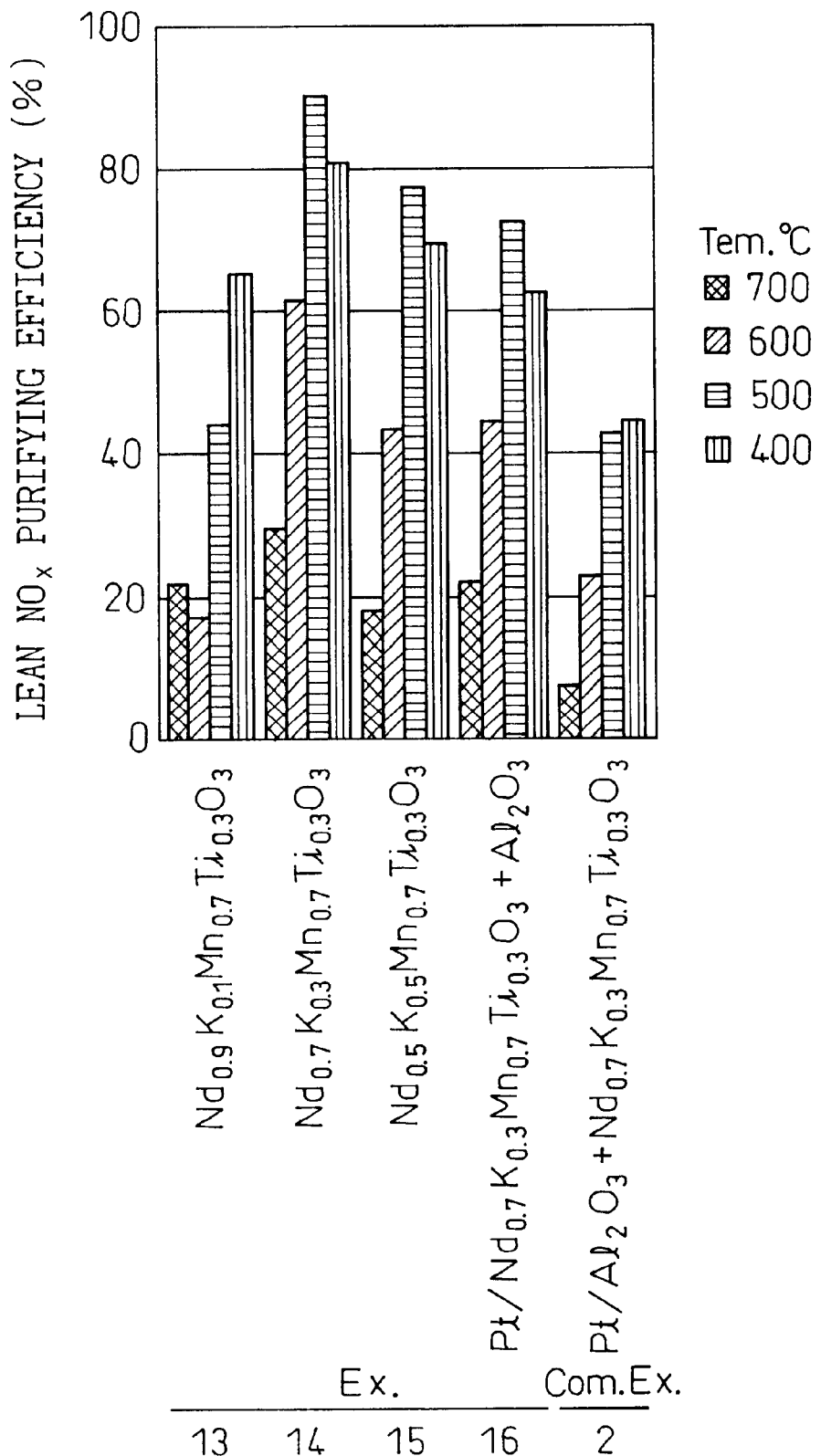
FIG. 3 is a graph showing a comparison of different catalysts in terms of the relationship between exhaust gas temperature and $NO_x$ purifying efficiency.

Four atmosphere temperatures were used, 400° C., 500° C., 600° C. and 700° C., and the results for the NO$_x$ purifying efficiency at each temperature are shown in FIGS. 1 to 3.

Results of the Examples

By comparing the NO$_x$ purifying efficiency for Examples 1 to 16 with Comparative Example 1 it is seen that the catalysts containing specific potassium-containing complex oxides of perovskite type had a notably higher NO$_x$ purifying efficiency at 600° C. and 700° C. than the catalyst on which potassium was carried using potassium acetate.

By comparing the NO$_x$ purifying efficiency for Examples 1 to 16 with Comparative Example 2 it is seen that the catalysts with platinum carried on the complex oxide of the perovskite type had notably higher NO$_x$ purifying efficiency than the catalyst comprising the platinum-carried γ-alumina and complex oxide of the perovskite type. This demonstrates that loading platinum onto complex oxides of the perovskite type is effective for purification of NO$_x$.

By comparing the NO$_x$ purifying efficiency for Examples 1 to 6 with Examples 7 to 15, it is seen that replacement of a portion of the B sites with Ti results in a further improvement in the NO$_x$ efficiency.

As explained above, it is possible to provide catalysts for purifying an exhaust gas that have a high NO$_x$ purifying efficiency even at high temperatures exceeding approximately 500° C.

What is claimed is:

1. A catalyst, for purifying an exhaust gas, comprising:
   at least one catalyst component selected from the group consisting of Pt, Pd, Rh, Au, Ag and Ir, and
   a complex oxide of the perovskite type represented by the structural formula ABO$_3$, where each of A and B is at least one metal and said complex oxide comprises at least two different metal elements,
   wherein said catalyst component is carried on said complex oxide, and at least one metal selected from the group consisting of alkali metals and alkaline earth metals is further carried on said complex oxide.

2. The catalyst, for purifying an exhaust gas, according to claim 1, wherein at least one inorganic oxide selected from the group consisting of alumina, titania, zirconia and silica is mixed with said complex oxide.

3. A catalyst, for purifying an exhaust gas, comprising:
   at least one catalyst component selected from the group consisting of Pt, Pd, Rh, Au, Ag and Ir, and a complex oxide of the perovskite type,
   wherein said perovskite type is represented by the structural formula:
   La$_{1-x}$K$_x$BO$_3$, wherein B is at least one metal selected from the group consisting of Mn, Co, Fe and Ni, and $0 \leq x < 1$, and
   wherein said catalyst component is carried on said complex oxide.

4. The catalyst, for purifying an exhaust gas, according to claim 3, wherein $0.05 < x < 1$.

5. The catalyst, for purifying an exhaust gas, according to claim 3, wherein $0.1 < x < 0.5$.

6. The catalyst, for purifying an exhaust gas, according to claim 3, wherein $0.2 < x < 0.4$.

7. The catalyst, for purifying an exhaust gas, according to claim 3, wherein $0.1 < x < 0.4$.

8. The catalyst, for purifying an exhaust gas, according to claim 3, wherein at least one metal selected from the group consisting of alkali metals and alkaline earth metals is further carried on said complex oxide.

9. The catalyst, for purifying an exhaust gas, according to claim 3, wherein at least one inorganic oxide selected from the group consisting of alumina, titania, zirconia and silica is mixed with said complex oxide.

10. A catalyst, for purifying an exhaust gas, comprising:

at least one catalyst component selected from the group consisting of Pt, Pd, Rh, Au, Ag and Ir, and a complex oxide of perovskite type, wherein said perovskite type is represented by the structural formula:

$A_{1-x}K_xB_{1-y}Ti_yO_3$, wherein A is at least one metal selected from the group consisting of La, Ce, Pr, Nd, Sm, Eu, Gd and Y, B is at least one metal selected from the group consisting of Mn, Co, Fe and Ni, $0.05<x<1$ and $0\leq y<1$, and wherein said catalyst component is carried on said complex oxide.

11. The catalyst, for purifying an exhaust gas, according to claim 10, wherein $0.05<y<1$.

12. The catalyst, for purifying an exhaust gas, according to claim 10, wherein $0.1<x<0.5$ and $0.1<y<0.5$.

13. The catalyst, for purifying an exhaust gas, according to claim 10, wherein $0.1<x<0.4$ and $0.1<y<0.4$.

14. The catalyst, for purifying an exhaust gas, according to claim 10, wherein $0.2<x<0.4$ and $0.2<y<0.4$.

15. The catalyst, for purifying an exhaust gas, according to claim 10, wherein at least one metal selected from the group consisting of alkali metals and alkaline earth metals is further carried on said complex oxide.

16. The catalyst, for purifying an exhaust gas, according to claim 10, wherein at least one inorganic oxide selected from the group consisting of alumina, titania, zirconia and silica is mixed with said complex oxide.

17. A catalyst, for purifying an exhaust gas, comprising:

at least one catalyst component selected from the group consisting of Pt, Pd, Rh, Au, Ag and Ir, and a complex oxide of perovskite type, wherein said perovskite type is represented by the structural formula:

$A_{1-x}K_xB_{1-y}Ti_yO_3$, wherein A is at least one metal selected from the group consisting of La, Ce, Pr, Nd, Sm, Eu, Gd and Y, B is at least one metal selected from the group consisting of Mn, Co, Fe and Ni, $0<x<1$ and $0.05<y<1$, and wherein said catalyst component is carried on said complex oxide.

18. The catalyst, for purifying an exhaust gas, according to claim 17, wherein $0.05<x<1$.

19. The catalyst, for purifying an exhaust gas, according to claim 17, wherein $0.1<x<0.5$ and $0.1<y<0.5$.

20. The catalyst, for purifying an exhaust gas, according to claim 17, wherein $0.1<x<0.4$ and $0.1<y<0.4$.

21. The catalyst, for purifying an exhaust gas, according to claim 17, wherein $0.2<x<0.4$ and $0.2<y<0.4$.

22. The catalyst, for purifying an exhaust gas, according to claim 17, wherein at least one metal selected from the group consisting of alkali metals and alkaline earth metals is further carried on said complex oxide.

23. The catalyst, for purifying an exhaust gas, according to claim 17, wherein at least one inorganic oxide selected from the group consisting of alumina, titania, zirconia and silica is mixed with said complex oxide.

* * * * *